G. A. HANLY & G. R. MARTIN.
GAS DISTRIBUTING SYSTEM.
APPLICATION FILED JUNE 1, 1909.

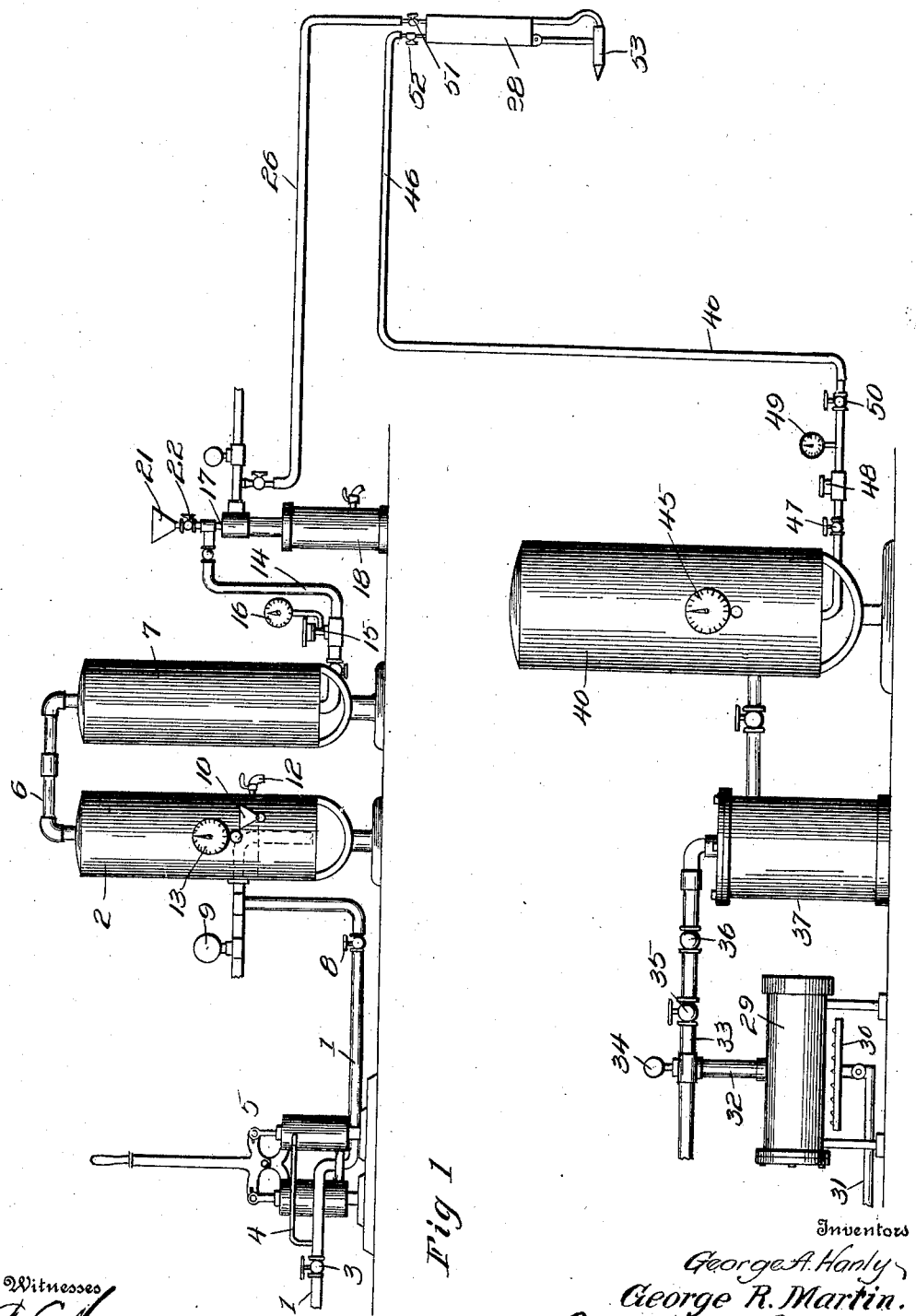

976,734.

Patented Nov. 22, 1910.

2 SHEETS—SHEET 2.

Witnesses
T. L. Mcclatchee.
R. M. Smith.

Inventors
George A. Hanly
George R. Martin
By Victor J. Evans
Attorney

UNITED STATES PATENT OFFICE.

GEORGE A. HANLY AND GEORGE R. MARTIN, OF CHICAGO, ILLINOIS.

GAS-DISTRIBUTING SYSTEM.

976,734.

Specification of Letters Patent. Patented Nov. 22, 1910.

Application filed June 1, 1909. Serial No. 499,283.

*To all whom it may concern:*

Be it known that we, GEORGE A. HANLY and GEORGE R. MARTIN, citizens of the United States, residing at Chicago, in the county of Cook and State of Illinois, have invented new and useful Improvements in Gas-Distributing Systems for Welding Apparatus, of which the following is a specification.

This invention relates to improved means for supplying acetylene or other gas to welding apparatus, the object of the invention being to provide effective and safe apparatus involving the use of acetylene gas and oxygen for the purpose of effecting the operation of welding.

With the above general object in view, the invention consists in the novel construction, combination and arrangement of parts as herein fully described, illustrated and claimed.

Figure 4:
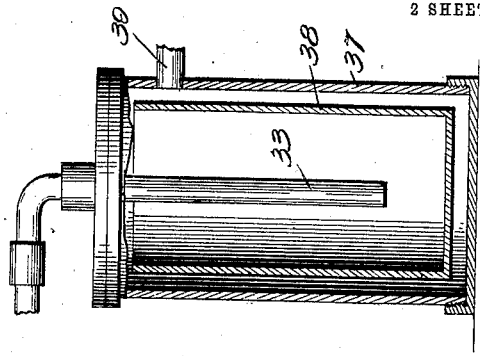
Figure 3:
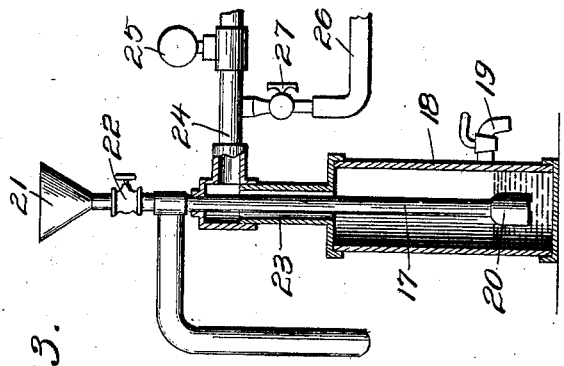
Figure 2:
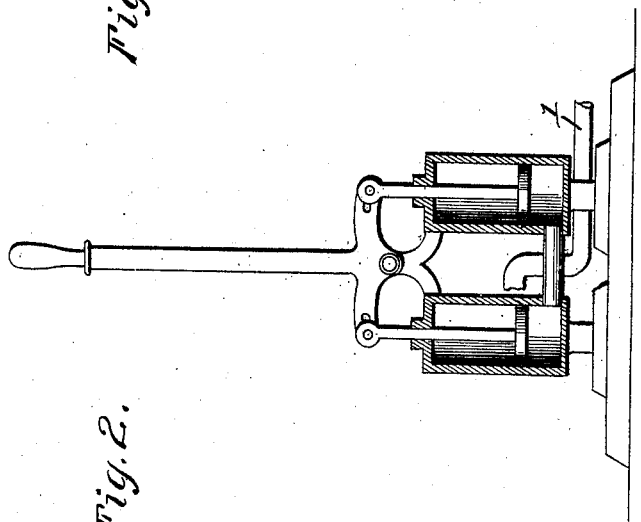

In the accompanying drawings:—Figure 1 is a side elevation of the complete apparatus. Fig. 2 is a detail sectional view of the pump. Fig. 3 is a similar view of the water seal tank. Fig. 4 is an enlarged detail vertical section through the purifier tank.

In carrying out the invention, an ordinary acetylene lighting plant or other gas generator is employed which is in communication with a pipe 1 which leads from such lighting plant or generator to a cooling tank 2. Associated with the pipe 1 at a suitable point is a stop cock 3 and communicating with the pipe 1 adjacent to the stop cock 3 is a pipe 4 affording communication between the pipe 1 and a pump 5 shown of conventional form, the said pump being utilized for forcing the gas under pressure into and through a cooling tank and through a connection 6 interposed between the cooling tank and a gas compression tank 7. It will be understood that the gas is forced under pressure into the tank 7 which thus forms a storage or supply tank for the welding apparatus when in use. The pipe 1 between the pump and the tank 2 may be provided with another stop cock 8 and may also be equipped with a safety valve 9. The cooling tank comprises a filling cup or funnel 10 arranged just above the normal water level therein, the water level being indicated by dotted lines and also adjacent to the water level is a drain spout 12. The cooling tank is also provided with a pressure gage 13.

From the compression tank 7, a connection 14 provided with a pressure governor 15 and a pressure gage 16 leads into a vertical pipe 17 extending downward into a water seal chamber 18 in which a certain water level is maintained as shown in Fig. 3, a drain spout 19 being located just about the water level. The lower end of the pipe 17 is enlarged to form a nozzle 20 which is submerged under the liquid contained in the water seal tank. At its upper end said tank is provided with a filling cup 21 beneath which is a stop cock 22. The tank 18 is provided with an upstanding neck 23 through which the gas rises and enters a connection 24 equipped with a safety valve 25. From the connection 24 a gas connection 26 controlled by a stop cock 27 leads off to a mixer 28.

29 designates a retort in which a suitable chlorate is introduced and heated by means of a burner 30 arranged below the retort and supplied by a pipe 31 leading to the lighting plant or acetylene generator. From the retort, a pipe 32 extends upward and communicates with a horizontal pipe 33 equipped with a safety valve 34. The pipe 33 is also provided with a stop cock 35 and a check valve at 36. The pipe 33 leads into a purifying tank 37 shown in detail in Fig. 4, said pipe terminating near the lower end of the inner chamber of said tank. The inner chamber 38 of said tank is adapted to contain a purifying liquid and is smaller than the outer wall of the tank to allow an intervening space both at the bottom and around the sides of the inner chamber so that the oxygen escaping from the lower end of the pipe 33 is forced to travel upward toward the top edge of the inner chamber and thence between the two walls of the purifying tank and out through a connection 39 which leads into an oxygen storing tank 40 provided with a pressure gage 45. From the tank 45 a connection 46 leads to the mixer 28 above referred to and said pipe 46 is provided with a stop cock 47 and pressure governor 48 and a pressure gage 49. Said pipe may also be provided with an additional stop cock 50 on the opposite side of the pressure gage and governor from the stop cock 47. Adjacent to the points of entrance of the gas and oxygen connections 26 and 46 with the mixer 28, each of said pipes may be provided with stop cocks 51 and 52. The mixture in the mixer 28 is carried to a suitable burner 53 at the point of which the gas is ignited and forms a hot flame admirably adapted for welding purposes.

From the foregoing description, it will be understood that the apparatus hereinabove described is adapted for use in connection with an ordinary commercial acetylene lighting plant or generator and that by means of the water seal and safety valves arranged as stated, the device is rendered safe in use. The safety valves are preferably arranged to blow off at a pressure of twelve pounds per square inch, said pressure having been amplified sufficiently for the purpose.

We claim:—

1. In a gas distributing system, the combination of a gas supply pipe, a cooling tank containing a body of water into which the said pipe delivers gas, a storage tank connected with the gas space of the cooling tank, a pipe leading from the storage tank, a water seal chamber into which the last mentioned pipe extends, and a pipe leading from the said chamber.

2. In a gas distributing system, the combination of a gas supply pipe, a pump connected therewith for raising the pressure of the gas, a cooling tank connected directly with the discharge side of the pump and containing a body of water into the bottom of which the gas enters from the pump, a storage tank adjacent the cooling tank, means for connecting the tops of the tanks together to permit the cooled gas to flow into the storage tank, a pipe leading from the storage tank, a water-sealed chamber with which the last-mentioned pipe communicates, and a pipe connected with the water-sealed chamber to conduct gas therefrom.

In testimony whereof we affix our signatures in presence of two witnesses.

GEORGE A. HANLY.
GEORGE R. MARTIN.

Witnesses:
WALTER D. JONES,
A. L. WIDDICOMBE.